US008995222B2

United States Patent
Xia et al.

(10) Patent No.: US 8,995,222 B2
(45) Date of Patent: Mar. 31, 2015

(54) SYSTEM AND METHOD FOR ACCURATE DETERMINATION OF OCEAN BOTTOM SEISMOMETER POSITIONING AND TIMING

(75) Inventors: Ganyuan Xia, Sunninghill (GB); Gerard Beaudoin, Houston, TX (US)

(73) Assignee: BP Corporation North America Inc., Houston, TX (US)

( * ) Notice: Subject to any disclaimer, the term of this patent is extended or adjusted under 35 U.S.C. 154(b) by 784 days.

(21) Appl. No.: 13/102,228

(22) Filed: May 6, 2011

(65) Prior Publication Data

US 2011/0273958 A1 Nov. 10, 2011

Related U.S. Application Data

(60) Provisional application No. 61/331,986, filed on May 6, 2010.

(51) Int. Cl.
*G01V 1/38* (2006.01)
(52) U.S. Cl.
CPC .......... *G01V 1/3817* (2013.01); *G01V 2200/12* (2013.01); *G01V 2200/14* (2013.01)
USPC ................. 367/21; 367/15; 367/127; 367/129
(58) Field of Classification Search
CPC .............. G01V 1/3817; G01V 1/3835; G01V 2200/12; G01V 2200/14
USPC ......... 367/15, 19, 76, 79, 127, 129, 134, 144, 367/21; 370/507; 702/6, 11, 13, 16, 18
See application file for complete search history.

(56) References Cited

U.S. PATENT DOCUMENTS

| 4,281,403 | A * | 7/1981 | Siems et al. ..................... 367/76 |
| 5,128,904 | A * | 7/1992 | Chambers ..................... 367/129 |
| 5,696,733 | A * | 12/1997 | Zinn et al. ........................ 367/19 |
| 5,940,778 | A * | 8/1999 | Marfurt et al. .................. 702/16 |
| 6,912,465 | B2 * | 6/2005 | Collins et al. ..................... 702/6 |
| 7,796,466 | B2 * | 9/2010 | Combee et al. ................. 367/15 |
| 7,876,266 | B2 * | 1/2011 | Rhoads ......................... 342/463 |

FOREIGN PATENT DOCUMENTS

GB 2394045 A * 4/2004

OTHER PUBLICATIONS

"Moore-Penrose pseudoinverse," downloaded Apr. 25, 2014 from http://en.wikipedia.org/wiki/Moore-Penrose_pseudoinverse, pp. 1-11.*

(Continued)

*Primary Examiner* — Isam Alsomiri
*Assistant Examiner* — Daniel L Murphy
(74) *Attorney, Agent, or Firm* — Gunnar Heinisch (57) ABSTRACT

There is provided herein a system and method of seismic exploration that produces improved locations and timings for ocean bottom seismometers. The instant method utilizes linearized inversion in conjunction with a conventionally accurate clock to provide both time and positioning for each OBS unit with high accuracy as compared with the prior art approach. Inversion is one mathematical tool that effectively performs the requisite triangulation. Furthermore, the clock drift can be accounted for in the inversion scheme. The inversion not only determines the OBS position and shot timing errors, but also estimates the accuracy of the position and timing determination.

10 Claims, 6 Drawing Sheets

(56) References Cited

OTHER PUBLICATIONS

"Moore-Penrose pseudoinverse," downloaded Apr. 26, 2014 from http://en.wikipedia.org/wiki/Moore-Penrose_pseudoinverse, pp. 1-8, edit of May 5, 2009.*

"Moore-Penrose pseudoinverse," downloaded Apr. 26, 2014 from http://web.archive.org/web/20091004031305/http://en.wikipedia.org/wiki/Moore-Penrose_pseudoinverse, pp. 1-9, version archived Oct. 4, 2009.*

Yilmaz, "Seismic Data Processing", 1987, pp. 9-89, Volume Chpt. 1, Publisher: Society of Exploration Geophysists, Published in: US.

Yilmaz, "Seismic Data Processing", 1987, pp. 384-427, Volume Chpt. 6, Publisher: Society of Exploration Geophysicists, Published in: US.

* cited by examiner

SYSTEM AND METHOD FOR ACCURATE DETERMINATION OF OCEAN BOTTOM SEISMOMETER POSITIONING AND TIMING

RELATED CASE

This application claims the benefit of U.S. Provisional Patent Application Ser. No. 61/331,986 filed on May 6, 2010, and incorporates said provisional application by reference into this disclosure as if fully set out at this point.

TECHNICAL FIELD

This invention relates to the general subject of seismic exploration and, in particular, to systems and methods for determining ocean bottom and other seismic receiver locations and timing for use with a seismic survey.

BACKGROUND OF THE INVENTION

A seismic survey represents an attempt to image or map the subsurface of the earth by sending sound energy down into the ground and recording the "echoes" that return from the rock layers below. The source of the down-going sound energy might come, for example, from explosions or seismic vibrators on land, or air guns in marine environments. During a seismic survey, the energy source is positioned at various locations near the surface of the earth above a geologic structure of interest. Each time the source is activated, it generates a seismic signal that travels downward through the earth, is reflected or transmitted, and, upon its return, is recorded at a great many locations on the surface. Multiple source/recording combinations are then combined to create a near continuous profile of the subsurface that can extend for many miles. In a two-dimensional (2D) seismic survey, the recording locations are generally laid out along a single line, whereas in a three dimensional (3D) survey the recording locations are distributed across the surface, sometimes as a series of closely spaced adjacent two-dimensional lines and in other cases as a grid of source and receiver lines that are arranged to be at some other angle with respect to each other. In simplest terms, a 2D seismic line can be thought of as giving a cross sectional picture (vertical slice) of the earth layers as they exist directly beneath the recording locations. A 3D survey produces a data "cube" or volume that is, at least conceptually, a 3D picture of the subsurface that lies beneath the survey area. In reality, though, both 2D and 3D surveys interrogate some volume of earth lying beneath the area covered by the survey.

A seismic survey is composed of a very large number of individual seismic recordings or traces. In a typical 2D survey, there will usually be several tens of thousands of traces, whereas in a 3D survey the number of individual traces may run into the multiple millions of traces. (Chapter 1, pages 9-89, of *Seismic Data Processing* by Ozdogan Yilmaz, Society of Exploration Geophysicists, 1987, contains general information relating to conventional 2D processing and that disclosure is incorporated herein by reference.) General background information pertaining to 3D data acquisition and processing may be found in Chapter 6, pages 384-427, of Yilmaz, the disclosure of which is also incorporated herein by reference.

A seismic trace is a digital recording of the acoustic energy reflecting from inhomogeneities or discontinuities in the subsurface, a partial reflection occurring each time there is a change in the elastic properties of the subsurface materials. The digital samples are usually acquired at 0.002 second (2 millisecond or "ms") intervals, although 4 milliseconds and 1 millisecond sampling intervals are also common. Each discrete sample in a conventional digital seismic trace is associated with a travel time, and in the case of reflected energy, a two-way travel time from the source to the reflector and back to the surface again, assuming, of course, that the source and receiver are both located on the surface. Many variations of the conventional source-receiver arrangement are used in practice, e.g. VSP (vertical seismic profiles) surveys, ocean bottom surveys, etc. Further, the surface location of every trace in a seismic survey is carefully tracked and is generally made a part of the trace itself (as part of the trace header information). This allows the seismic information contained within the traces to be later correlated with specific surface and subsurface locations, thereby providing a means for posting and contouring seismic data—and attributes extracted therefrom—on a map (i.e., "mapping").

The data in a 3D survey are amenable to viewing in a number of different ways. First, horizontal "constant time slices" may be taken extracted from a stacked or unstacked seismic volume by collecting all of the digital samples that occur at the same travel time. This operation results in a horizontal 2D plane of seismic data. By animating a series of 2D planes it is possible for the interpreter to pan through the volume, giving the impression that successive layers are being stripped away so that the information that lies underneath may be observed. Similarly, a vertical plane of seismic data may be taken at an arbitrary azimuth through the volume by collecting and displaying the seismic traces that lie along a particular line. This operation, in effect, extracts an individual 2D seismic line from within the 3D data volume.

Seismic data that have been properly acquired and processed can provide a wealth of information to the explorationist, one of the individuals within an oil company whose job it is to locate potential drilling sites. For example, a seismic profile gives the explorationist a broad view of the subsurface structure of the rock layers and often reveals important features associated with the entrapment and storage of hydrocarbons such as faults, folds, anticlines, unconformities, and sub-surface salt domes and reefs, among many others. During the computer processing of seismic data, estimates of subsurface rock velocities are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences and that correlation applied to seismic data collected over new exploration targets.

In recent years there has been increasing interest in offshore hydrocarbon targets. This might be for many reasons, but certainly offshore tracts are attractive exploration targets because they offer some of the last relatively accessible unexplored targets. Of course, the seismic method has been key in this exploration effort.

Historically, marine seismic exploration has been performed using towed streamer arrays. This has proven to be an effective means of acquiring data over large areas. However, there are known problems with towed streamer surveys including, for example, the sometimes excessive amount of noise generated by the waves, boat engine, etc., can tend to obscure subtle (and/or deep) exploration targets.

As a consequence, in some instances it has proven to be advantageous to shift to an approach that utilizes receivers that have been placed on the ocean bottom. In this sort of seismic survey, ocean bottom seismometers ("OBS") are typically placed at predetermined ocean bottom locations by either releasing them above the target location and letting them sink to the bottom or placing them on the ocean floor through the use of a remotely operated underwater vehicle ("ROV"). An OBS of the sort considered herein will preferably be a self-contained data-acquisition system that records seismic data generated by active sources such as airguns, as well as signals generated by passive seismic sources such as earthquakes, buoys, etc.

OBS units typically contain at least one pressure sensitive receiver (e.g., a hydrophone) and one vertical geophone. OBS receivers may also contain a four-component system, i.e., a hydrophone plus three orthogonal geophones. A four-component OBS has the advantage of being able to record shear waves, which would not be recordable by a conventional towed array survey. Finally, because they are stationary at the bottom of the ocean, surveys conducted using OBS-type equipment will tend to contain less noise than conventional marine surveys which can result in much improved subsurface imaging.

There are many advantages to OBS systems that may outweigh the additional cost (as compared with conventional/streamer recordings) in many circumstances. First, a four-component system has the potential of capturing both the P- and S-waves that were created by the seismic source. The converted-mode data recorded by such a survey can be used to improve reservoir characterization and imaging full-waveform seismic signals. Second, the resulting data is likely to be higher in bandwidth than would be obtained from a hydrophone-only survey. This has the potential to improve the illumination of complex targets (e.g., target proximate to or below salt domes). Additionally, greater sensitivity of the OBS systems means that data at greater azimuths may be captured and recorded. OBS systems also allow collection of regularly spaced seismic data in areas where there are obstructions that would impede the path of a seismic ship (e.g., offshore platforms, etc.). Finally, this approach allows receivers to be permanently deployed on the sea bed which increases the repeatability of the seismic collected during 4-D (i.e., time lapse) surveys.

However, OBS surveys are not without their problems. In addition to the increased cost (as compared with a conventional marine survey), certain unique problems arise when OBS equipment is employed.

One of the more vexing problems is that of determining the position and timing of each seismic unit. By way of explanation, after they are deployed the OBS units will typically be left on the ocean floor for some period of time during which time there may be limited (or no) communication between the OBS units and the source boat. The internal clock of an OBS device is typically synchronized with a standard clock before deployment and then again after recovery. Between deployment and recovery, the OBS receiver will rely on its internal clock which invariably tends to drift during the time it is in place. It is, thus, conventional to apply a deterministic time drift correction to the data after recovery to correct for accumulated inaccuracies in the clock timing. This correction, of course, may or may not be accurate. Although there are high accuracy clocks that would tend to reduce the magnitude of this problem (e.g., a very accurate clock with an accuracy of $10^{-10}$ seconds per day would provide sufficient accuracy for a typical ocean bottom survey of 30 days). However, such a solution is very costly.

If the free-fall mode of deployment is utilized, then the positions of those OBS units will not be precisely known. Instead, it is convention to determine the location of each receiver by reference to the first breaks of each shot. Of course, such a determination depends heavily on an accurate timing from the onboard clock. On the other hand, if a ROV is employed to plant the OBSs, the position of the units could be determined by a network of built-in acoustic modems. However, digital acoustic modems and highly accurate clocks are quite expensive and, additionally, tend to require much more power to operate that would a simple modem (used for limited communication with the surface boat) and a more conventional clock (e.g., one with an accuracy of about $10^{-7}$ seconds per day).

Heretofore, as is well known in the seismic processing and seismic interpretation arts, there has been a need for a better method of accurately determining OBS unit positions and timing. Accordingly, it should now be recognized, as was recognized by the present inventor, that there exists, and has existed for some time, a very real need for a method of seismic data processing that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

According to a first preferred aspect of the instant invention, there is provided a system and method for improved OBS location and timing that utilizes a conventionally accurate clock (e.g., $10^{-7}$) and that preferably relies on a linearized inversion scheme to provide both time and positioning for each OBS unit with high accuracy as compared with prior art approaches.

By way of summary, the direct arrivals are the events that travel directly from the shot to the OBS through the water. In an OBS gather, these direct arrivals tell in a general way how far each OBS is from each shot sensed by that unit. Given the relatively more reliable shot positions, an array of shots can pinpoint the OBS position by triangulation. Inversion is one mathematical tool that effectively performs the requisite triangulation. Furthermore, the clock drift can be accounted for in the inversion scheme. The inversion not only determines the OBS position and shot timing errors, but also estimates the accuracy of the position and timing determination.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which.

DETAILED DESCRIPTION

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

General Environment of the Invention

Figure 1:
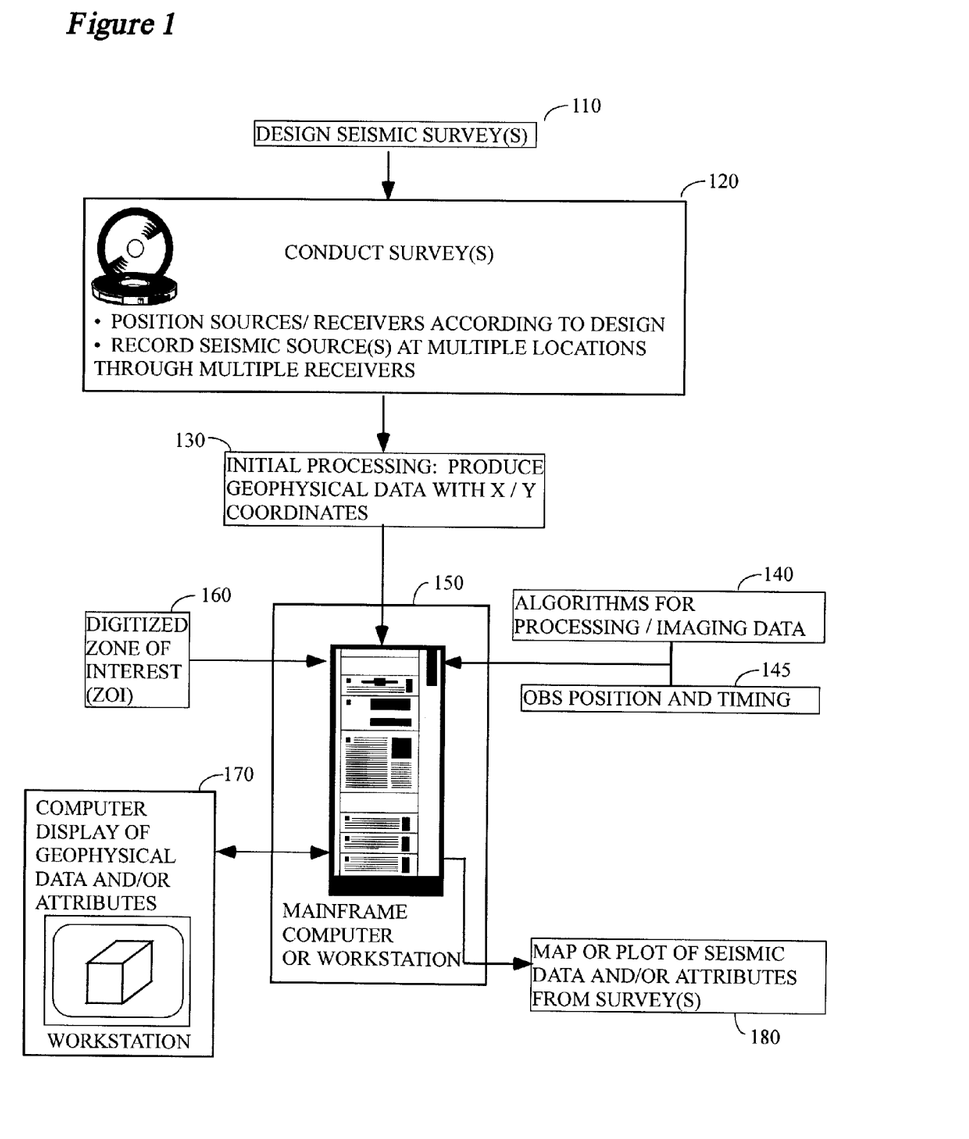
FIG. 1 illustrates a general environment of the instant invention.

FIG. 1 illustrates the general environment in which the instant invention would typically be used. As a preliminary step 110, it is customary to undertake at least some basic planning of a seismic survey (or surveys) in advance of collecting the data. In addition to determining the location of the survey on the surface of the earth, typically survey-related parameters such as the trace/shot spacing, sample rate, number of recording channels, etc., will also be specified in advance of conducting the survey. Seismic surveys are conducted both onshore and offshore, with geophones typically being used to record the seismic source on land and hydrophones being used in marine environments. In some instances, and as is discussed in greater detail below, OBS units (which typically contain a combination of geophones and hydrophones) are additionally used in marine surveys. Depending on the computer capabilities of the crew that acquires the seismic data, some amount of pre-processing (e.g., demux, source cross-correlation, debubble, etc.) might be performed on-site as the data are acquired (e.g., see step 215 of FIG. 2).

In the field, each receiver (or receiver group) typically gives rise to one seismic trace each time the source is activated, with OBS units typically yielding two to four seismic traces depending on how these units are configured. The raw/unprocessed traces that are collected in the field are typically written to a mass storage medium (e.g., magnetic tape, optical disk, magnetic disk, etc.) for transmission to the processing center. In the processing center a variety of preparatory processes are typically applied to the seismic traces to prepare them for a wide range of processing and imaging steps that conventionally follow. See steps 215 and 220 of FIG. 2 for some examples of these sorts of processes. The seismic traces (before, during, and after initial processing) might be stored, by way of example only, on hard disk, magnetic tape, magneto-optical disk, DVD disk, or other mass storage means. Note that it is conventional to associate each seismic trace with the position of the receiver (or receiver group) that gave rise to it and this is often done during the preparatory processing.

In the processing center, a variety of signal conditioning and/or imaging steps are typically performed. In the preferred arrangement, these steps will take the form of computer programs 140 that have been loaded onto a general purpose programmable computer 150 where they are accessible by a seismic interpreter or processor. Note that a general purpose computer 150 would typically include, in addition to mainframes, specialized workstations and PCs, computers that provide for parallel and massively parallel computations, wherein the computational load is distributed between two or more processors.

The instant invention will preferably be loaded (step 145) into such a computer 150 where one or more seismic surveys will be accessed and local attribute matching applied according to the methods discussed herein.

As is further illustrated in FIG. 1, in the preferred arrangement some sort of digitized zone of interest model 160 is often specified by the user and provided as input to the processing computer programs. This zone of interest might correspond to a particular reflector or layer in the subsurface that is believed to trap or contain hydrocarbon resources. In the case of a 3D seismic section, the zone of interest 160 would typically include specifics as to the lateral extent and thickness (which might be variable and could be measured in time, depth, frequency, etc.) of a subsurface target. The exact means by which such zones are created, picked, digitized, stored, and later read during program execution is unimportant to the instant invention and those of ordinary skill in the art will recognize that this might be done any number of ways.

Figure 2:
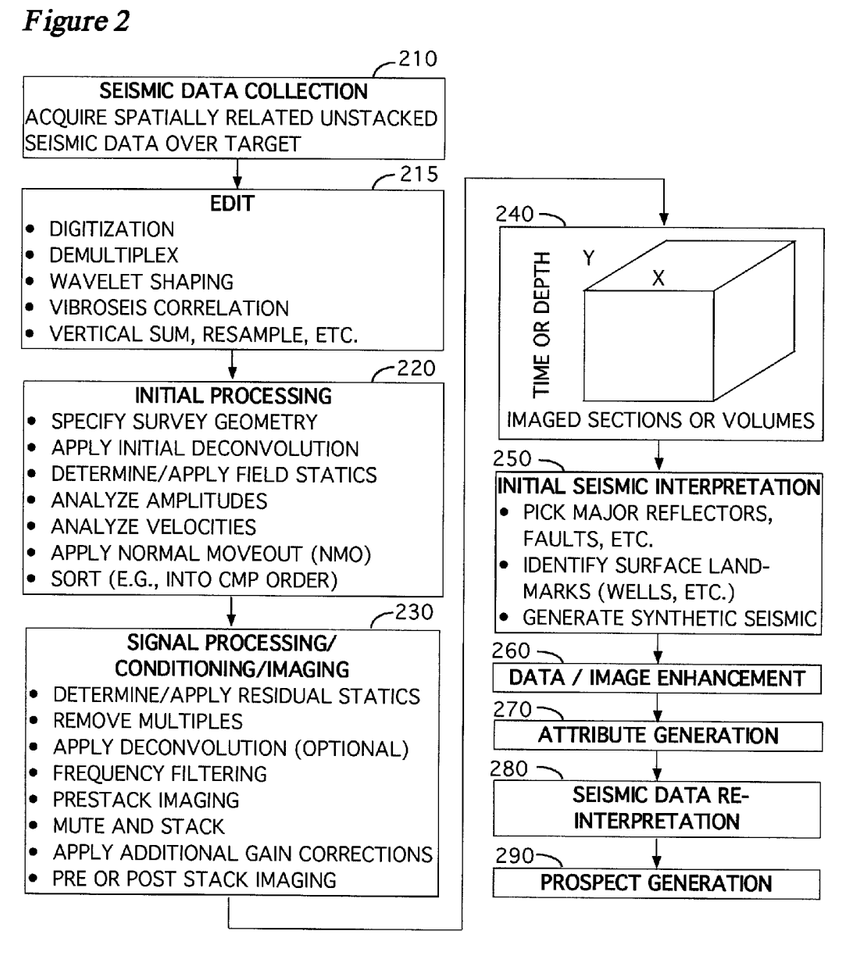
FIG. 2 contains a seismic processing sequence suitable for use with the instant invention.

Seismic processing programs 140 might be conveyed into the computer that is to execute them by means of, for example, a floppy disk, a magnetic disk, a magnetic tape, a magneto-optical disk, an optical disk, a CD-ROM, a DVD disk, a RAM card, flash RAM, a RAM card, a PROM chip, or loaded over a wired or wireless network. In a typical seismic processing environment, the various numerical treatments that are applied to the seismic data would be made part of a package of software modules that is designed to perform many of the processing steps listed in FIG. 2. Note that FIG. 2 is intended to represent a generalized processing scheme that describes in a general way processes that would be suitable for use with either land or marine data. Of course, those of ordinary skill in the art will recognize that land specific data processing steps in FIG. 2 such as vibrator source correlation, surface statics, etc., would not typically be applicable to marine data, as debubble would not typically be used on land data.

Returning to FIG. 1, the processed seismic traces would then typically be sorted into CMP gathers (3-D data will typically be binned into CMPs), stacked, and displayed either at a high-resolution color computer monitor 170 or in hardcopy form as a printed seismic section or a map 180. The seismic interpreter would then use the displayed images to assist him or her in identifying subsurface features conducive to the generation, migration, or accumulation of hydrocarbons.

As was indicated previously, seismic traces that have been acquired according to the instant invention will preferably be subjected to some or all of the processing steps listed in FIG. 2. Those of ordinary skill in the art will recognize that these steps are only broadly representative of the sorts of processes that might be applied to such data and the choice and order of the processing steps, and the particular algorithms involved, may vary markedly depending on the individual seismic processor, the signal source (dynamite, vibrator, air gun, etc.), the survey location (onshore, offshore, combination, etc.), the company that processes the data, etc.

As an initial step a 2D or 3D seismic survey is conducted according to the instant invention over a particular volume of the earth's subsurface (step 210). The data collected in the field consist of unstacked (i.e., unsummed) seismic traces which contain digital information representative of the volume of the earth lying beneath the survey After the seismic data are acquired (step 210), they are typically taken from the field to a processing center where some initial or preparatory processing steps are applied to them. Demux, gain recovery, cross correlation, wavelet shaping, bad trace removal, etc., (step 215) are typically applied early in sequence and are designed to place the field seismic records in condition for subsequent processing. That being said, those of ordinary skill in the art will recognize that some or all of the foregoing processes (e.g., demux, cross correlation, initial gain recovery, etc.) might be performed in the field (rather than in a processing center), depending on the processing capability available there. This might be followed by specification of the geometry of the survey (step 220) and storing of a shot/receiver number and a surface location as part of each seismic trace header. Once the geometry has been specified, it is customary to perform a velocity analysis, the resulting velocities being useful in many processing contexts including, by way of example only, time and/or depth imaging.

After the initial pre-stack processing is completed, typically the seismic signal on the unstacked seismic traces will be conditioned before stacked (or summed) data volumes (step 230) are created. In FIG. 2 step 230 contains a typical "Signal Processing/Conditioning/Imaging" processing sequence, but those skilled in the art will recognize that many alternative processes could be used in place of the ones listed in the figure. In any case, the ultimate goal from the standpoint of the explorationist is the production of a stacked seismic volume or, in the case of 2D data, a stacked seismic line for use in the exploration for hydrocarbons within the subsurface of the earth.

As is suggested in FIG. 2, any digital sample within a stacked seismic volume is uniquely identified by a (X, Y, TIME) triplet, with the X and Y coordinates representing some position on the surface of the earth, and the time coordinate measuring a recorded arrival time within the seismic trace (step 240). For purposes of specificity, it will be assumed that the X direction corresponds to the "in-line" direction, and the Y measurement corresponds to the "cross-line" direction, as the terms "in-line" and "cross-line" are generally understood in the art. Although time is a preferred and most common vertical axis unit, those skilled in the art understand that other units are certainly possible might include, for example, depth or frequency. Additionally, it is well known to those skilled in the art that it is possible to convert seismic traces from one axis unit (e.g., to another (e.g., depth) using standard mathematical conversion techniques.

The explorationist may do an initial interpretation 250 of the resulting stacked volume, wherein he or she locates and identifies the principal reflectors and faults wherever they occur in the data set. This might be followed by additional data enhancement 260 and/or attribute generation (step 270) of the stacked or unstacked seismic data. In many cases the explorationist will revisit his or her original interpretation in light of the additional information obtained from the data enhancement and attribute generation steps (step 280). As a final step, the explorationist will typically use information gleaned from the seismic data together with other sorts of data (magnetic surveys, gravity surveys, LANDSAT data, regional geological studies, well logs, well cores, etc.) to locate subsurface structural or stratigraphic features conducive to the generation, accumulation, or migration of hydrocarbons (i.e., prospect generation 290).

Typically, the instant invention would be implemented as part of the initial processing step 130.

Figures 3, 4, 5:
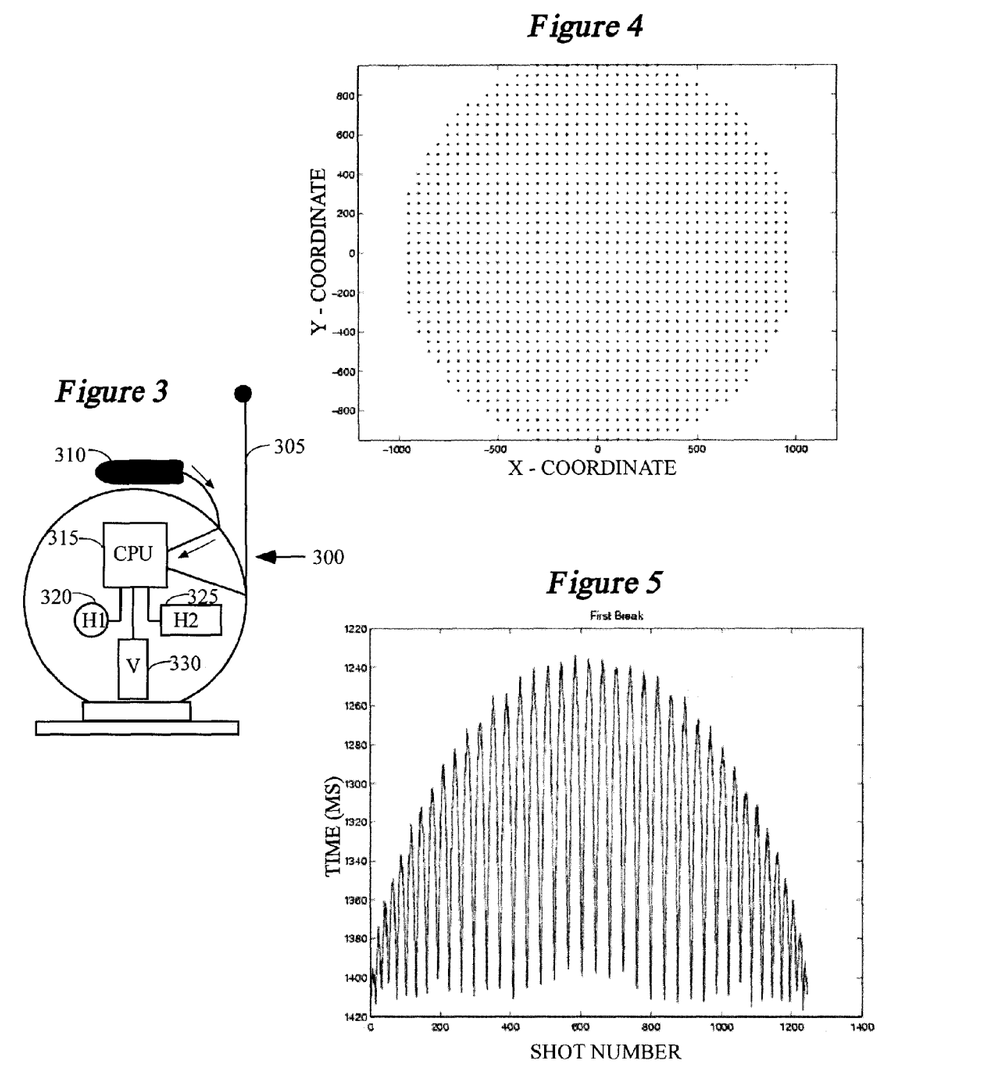
FIG. 3 contains a schematic illustration of a typical OBS unit.
FIG. 4 contains a schematic illustration of a common offset gather sorted by x and y coordinate.
FIG. 5 contains an example data set where the first break time was automatically picked.

Finally, FIG. 3 contains a schematic illustration of a typical OBS receiver station 300. Such a device might utilize an antenna 305 of some sort to transmit signals to and/or receive signals from the surface of the ocean. In some cases, the OBS station 300 might utilize an acoustic modem for communication. In such cases one of function of such a device would be to listen for a release signal from the surface. Receipt of such a signal would then result in part of the unit being released to float to the surface along with its recorded seismic data. This approach is often favored since the power required to transmit seismic data via radio or acoustic methods could drastically shorten the effective life of the unit on the ocean floor. Sensor-wise, the OBS station 300 will typically contain at least one hydrophone 310 that is in fluid communication with the surrounding water. Additionally, two horizontally situated geophones 320 and 325 (which are preferably oriented at right angles to each other) and a vertical geophone 330 will also be provided. The functioning of the station 300 will be controlled by one or more CPUs 315.

Preferred Embodiments

According to a first preferred embodiment and as is generally illustrated in FIG. 3, there is provided herein a method of determining OBS locations and timing that does not suffer from the disadvantages of the prior art.

As an initial matter, the first break time on an OBS receiver can be expressed as:

$$T = \frac{\sqrt{(x_s - x_r)^2 + (y_s - y_r)^2 + z(z_s - z_r)^2}}{v}$$

where T is the travel time from the source to the receiver through the water, $x_s$, $y_s$, and $z_s$ are the coordinates of the source, $x_r$, $y_r$, and $z_r$ are the 3-D coordinates of the receiver, and v is the water velocity which will be assumed, for purposes of the instant embodiment to be a constant value of about 1500 m/s. That being said, it is certainly possible that alternative velocities might be useful in some cases, depending, for example, on salinity, temperature, water depth, etc. Of course, this equation assumes at least approximate knowledge of the source location and activation time which are generally known with some precision.

In reality, because of the time drift, the first break time in a common receiver gather as measured within the OBS unit should be corrected for the timing error. Usually the drift is assumed to be a linear function of time, i.e.

$$T_{drift} + t_0 + at,$$

where $t_0$ is bulk shift time, a is the slope of the drift curve, and t is the length of time since the clock was last synchronized.

The observed first break time can then be expressed as:

$$T_{obs} = \frac{R}{v} + t_0 + at,$$

where $$R = \sqrt{(x_s - x_r)^2 + (y_s - y_r)^2 + (z_s - z_r)^2}.$$

In an OBS survey, the receivers are generally relatively sparsely and the sources are relatively densely populated. This situation gives rise to an over-determined problem in the solution for receiver coordinates and time shift.

Turning now to a detailed discussion of a preferred aspect of the instant invention, one preferred approach to solving this sort of problem is via an iterative linearized inversion. Let, $$m = [(G^T G)^{-1} + \epsilon I] G^T d,$$

where I is the identity matrix, $\epsilon$ is a whitening factor that is conventionally added to stabilize the matrix computation, m is the model update from the initial model $$m = [\Delta x_r, \Delta y_r, \Delta z_r, t_0, a]^T.$$

The variable d represents difference between the observed first break time and an initial trial model, and G is the Frechet derivative which has a convenient analytic form, $$G = \left[ \frac{x_r - x_s}{vR} \quad \frac{y_r - y_s}{vR} \quad \frac{z_r - z_s}{vR} \quad 1 \quad t \right],$$

with, $$(x_r, y_r, z_r) = (x_0, y_0, z_0)$$

during the first iteration. G is an N by 5 matrix that contains this calculation for each of the N trace/source activations associated with the current OBS receiver. Assuming that there is no prior knowledge about the model parameters, the posterior model covariance is:

$$C_m = [G^T C_d^{-1} G]^{-1}$$

where $C_d$ is the data covariance matrix which representing the noise level of the data. The square root of the diagonal elements of model covariance matrix, $C_m$, represents the standard deviation of the model parameter estimates.

Figure 9:
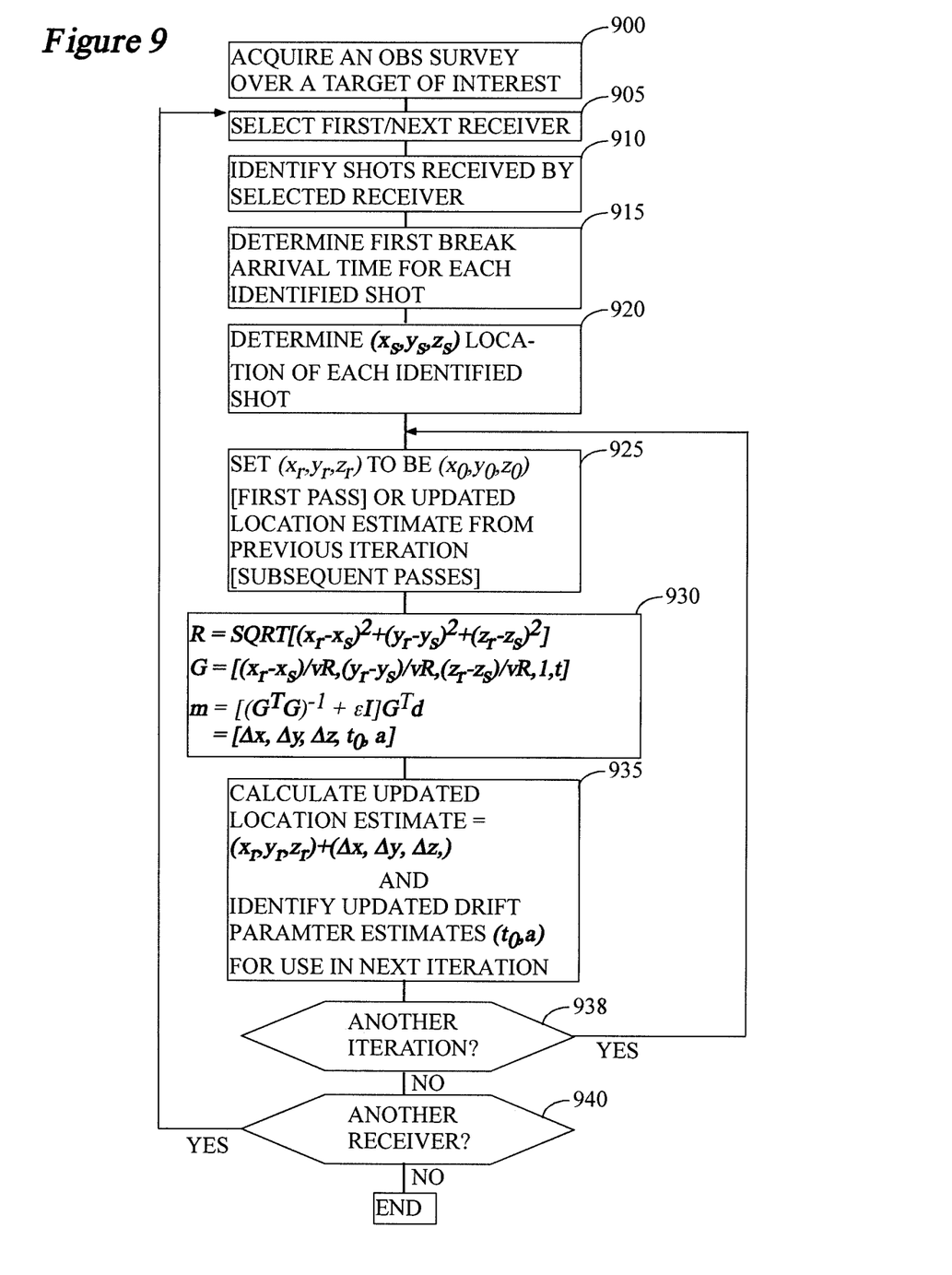
FIG. 9 contains an illustration of a preferred operating logic suitable for use with the instant invention.

Finally, and turning next to FIG. 9, according to a preferred aspect of the instant invention as a first step 900 an OBS survey will be acquired over a subsurface target of exploration interest. Next, the instant invention will preferably move sequentially through each receiver in the survey via a loop over steps 905-940. As a first step in that loop, preferably a receiver (or subsurface OBS station) will be selected (step 905). Next, the shots (i.e., source activations) that are recorded by this receiver will be identified (step 910).

Next, and preferably, the first break arrival time at the selected receiver will be determined for each identified shot (step 915). As has been discussed previously, there are well known algorithms for automatically identifying first breaks on seismic data. Alternatively, it has long been possible to manually pick first break arrivals on a computer screen or even using printed sections according to methods well known to those of ordinary skill in the art. Next, the coordinates (i.e., at least an "X" and a "Y" coordinate and, in some cases a "Z" coordinate as well) of each shot will preferably be identified.

At the first iteration an initial location $(x_0, y_0, z_0)$ for the selected receiver will be selected (step 925). This location might be obtained in many ways but, in some preferred embodiments, there will be at least an approximate known location of the receiver (e.g., the location at which the receiver was dropped into the water in the "drop and sink" method of placing OBS receivers). This means that the initial estimate for the variable R will preferably be taken to be:

$$R = \sqrt{(x_s - x_0)^2 + (y_s - y_0)^2 + (z_s - z_0)^2}.$$

After the first iteration, the updated location estimate $(x_r, y_r, z_r)$ from the previous iteration will be used instead.

Next, preferably the calculation discussed above will be implemented (step 930). As is known to those of ordinary skill in the art, the vector m will be used to update the input receiver positional estimate to obtain an improved estimate that will then be fed back into this same calculation to produce a still further improved estimate. That is, an updated estimate of the receiver location can be calculated as (step 935):

$$(x_r, y_r, z_r) + (\Delta x, \Delta y, \Delta z).$$

Additionally, and preferably, this iterative scheme will also produce an improved estimate for the time drift $(t_0, a)$ which will be used in the next iteration, if there is to be one.

In the preferred arrangement, a test will be conducted at each iteration to determine whether or not this iterative scheme has converged to a satisfactory solution. If so, (the "NO" branch of decision item 938), the instant inventive scheme will preferably leave this iterative loop. Otherwise, in the preferred arrangement the instant invention will branch back to step 925 via the "YES" option of decision item 938, where the location estimate and drift parameters will be updated before repeating the calculation 930.

Finally, in the preferred arrangement a determination will be made as to whether or not additional receivers are to be processed (decision item 940). If so (the "YES" branch of this decision item), the instant invention will preferably branch back to step 905, where another receiver will be selected. Otherwise, the instant invention will preferably end via the "NO" branch of decision item 940.

At the conclusion of the steps of FIG. 9 (i.e., upon reaching the "END" step) a more accurate (x,y,z) location estimate will be available for each OBS receiver that has been processed. Such coordinates might be utilized in connection with step 130 of FIG. 1 or at some point in the processing sequence of FIG. 2. The improved location information parameters for each OBS receiver will preferably be associated with each seismic trace that was recorded by that receiver. In some preferred embodiments, the location information will be added to each seismic trace header in order to make that information available for subsequent imaging and other algorithms. Then, given this more accurate location information, subsequent imaging steps will produce better and more accurate images of the subsurface. Additionally, the instant invention will also produce drift parameter estimates which can be used to correct subsequent timings obtained from each receiver, synchronize each receiver's internal clock, correct the time record for extraction of the receiver records, etc.

Of course, those of ordinary skill in the art will recognize that an accurate knowledge of each seismic receiver location is fundamental to accurate imaging of the subsurface. Thus, the improved receiver locations obtained by the instant method will make it possible to perform better migrations and other imaging techniques thereby improving the quality of the processed seismic data that is used in exploration.

Synthetic Example

FIGS. 4 through 8 contain an illustration of the operation of the instant method as applied to a synthetic dataset. The synthetic example consists of a single OBS receiver at water depth of 1800 meters with an areal distribution of shots. In this example, the source boat shot 200 sail lines with 200 shots per sail line over a period of 12 days. The shot and sail line spacing were both 50 meters. A clock drift of $-7 \times 10^{-9}$ with a reference time of 40 ms was added to the data. Random time shift in the order of 4 ms was also added.

FIG. 4 shows the source positions (x and y) that fall within a 1000 meter radius of the receiver location. It is a common offset gather sorted by x and y coordinate. The corresponding first break times (automatically picked) are displayed on FIG. 5. In practice, the first break time can be picked by cross correlating all pertinent traces with the pilot trace. The accuracy of the auto picking is on the order of 1 ms.

Figure 6:
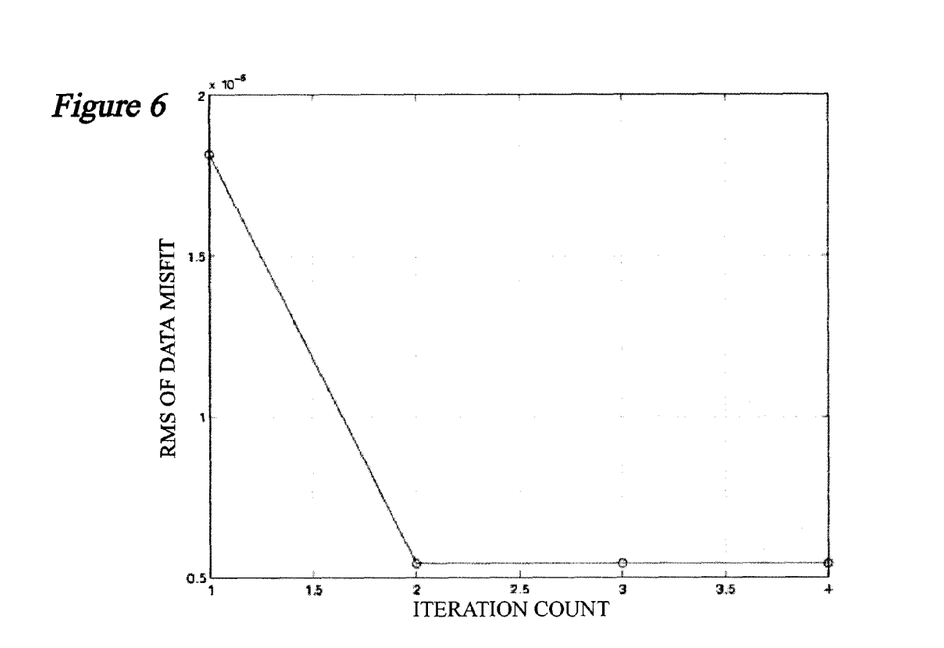
FIG. 6 illustrates the RMS error as a function of iteration count.
Figure 7:
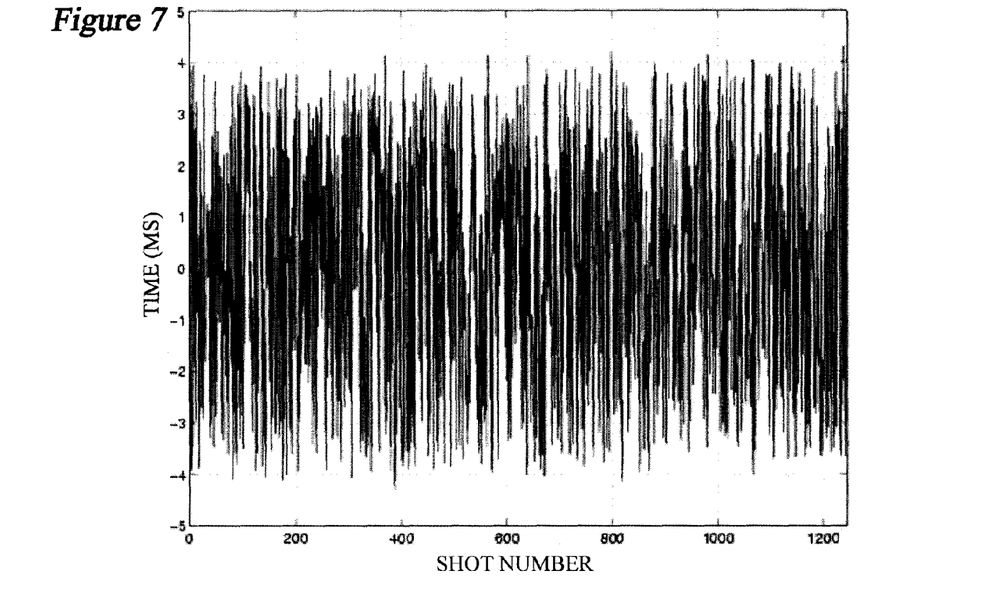
FIG. 7 contains a plot of the error in the first break prediction versus shot number.

For purposes of illustration, the true receiver position was perturbed by +50 meters. As an initial test, no drift was applied. In this example, the inversion converged to the true model after only two iterations as is indicated in FIG. 6 which contains a plot of the RMS error as a function of the number of iterations. The calculated first break time prediction error fell within ±4 ms. In FIG. 7 the first break time is plotted against shot number.

As was mentioned in the previous section, the error of model parameter estimation can be quantified by the posterior model covariance matrix. It was assumed for purposes of the instant example that no a priori knowledge of the model parameters was available. Table 1 lists the model parameter estimates and their corresponding errors in terms of standard deviation. The error analysis in this table indicates that the receiver X and Y coordinates were more accurately determined than was Z or $T_0$. Of course, mispositioning in the receiver coordinates will cause azimuthal asymmetry in the first break surface, but a mispositioning error in the Z coordinate will to tend to be compensated somewhat by a time error of the opposite sense. Also note that the error of the drift slope is in the order of $10^{-10}$ second/second, the accuracy of the atomic clock.

TABLE 1

Model parameter estimates and estimation error.

| | $\Delta X_r(m)$ | $\Delta Y_r(m)$ | $\Delta Z_r(m)$ | Ref Time $t_0$ (ms) | Drift Slope a |
|---|---|---|---|---|---|
| True Model | −50 | −50 | −50 | 40 | −7.00E−09 |
| Estimates | −50.5 | −50.4 | −48.5 | 39.2 | −7.10E−09 |
| Estimation Error | 0.2 | 0.2 | 1.2 | 0.7 | 9.00E−11 |

In general, the solution to a quasi-linear problem depends on the initial model. If the initial guess is sufficiently close to the true answer, the inverse becomes insensitive to the choice of the initial model.

Table 2 summarizes the inversion results according to the instant invention where the initial receiver X, Y, and Z positions were simultaneously perturbed from their actual positions by 0, 50, 100, and 150 meters. Again for purposes of this example no clock drift was assumed for the initial model in all cases. This table clearly shows that the instant inversion is not sensitive to the initial model location choice.

TABLE 2

Inversion results from different starting model.

| | Receiver $X_r(m)$ | Receiver $Y_r(m)$ | Receiver $Z_r(m)$ | Ref Time $t_0$ (ms) | Drift Slope a |
|---|---|---|---|---|---|
| $\Delta X_0 = \Delta Y_0 = \Delta Z_0 = 0$ | −0.5 | −0.4 | 1.5 | 39.2 | −7.00E−09 |
| $\Delta X_0 = \Delta Y_0 = \Delta Z_0 = -50$ | −50.5 | −50.4 | −48.5 | 39.2 | −7.00E−09 |
| $\Delta X_0 = \Delta Y_0 = \Delta Z_0 = -100$ | −100.5 | −100.4 | −98.5 | 39.2 | −7.30E−9 |
| $\Delta X_0 = \Delta Y_0 = \Delta Z_0 = -150$ | −150.5 | −150.4 | −148.5 | 39.2 | −7.30E−9 |

Figure 8:
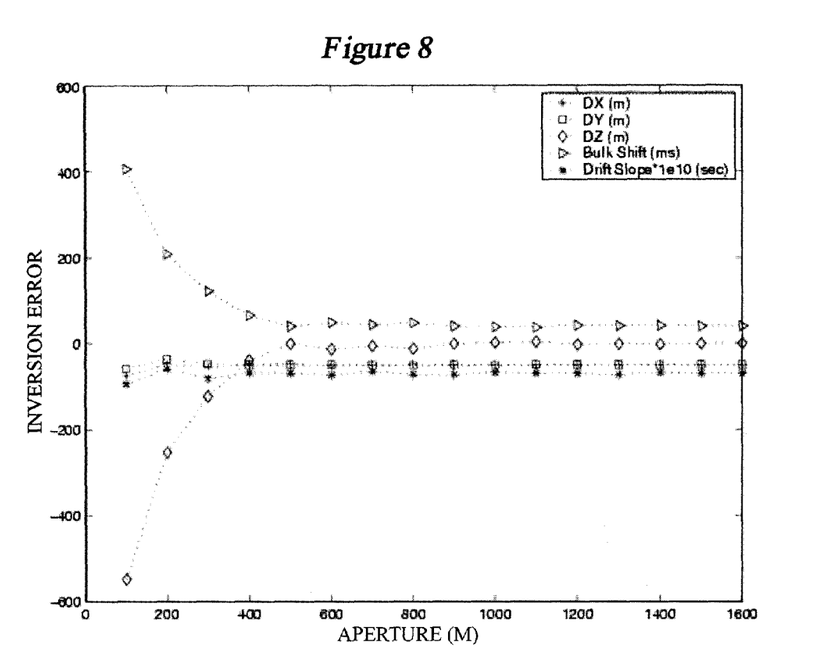
FIG. 8 illustrates that, for the models tested, perturbation of the initial model guess does not materially influence the ultimate solution.

The algorithms utilized by the instant invention will work best when the first break arrival times are linear as a function of offset from the source, which would generally be expected in most deep water marine settings. However, it would of interest to determine to what extent the instant inversion is sensitive to the data aperture, which is defined as the radius from the receiver. FIG. 8 shows that the inversion was stabilized for an aperture of 500 meters and larger. Increasing the aperture did not appreciably improve the accuracy.

Those of ordinary skill in the art will recognize that the method set out above could also be used in the reciprocal sense to invert for source positioning error given adequate receiver coverage. In one particular example, this reciprocal approach has been used to find an inline source position error on the order of about 2.6 m.

Although the preferred embodiment is based on a least squares vector norm approach to inversion (see, for example, the equation that defines m supra), those of ordinary skill in the art will recognize other norms could be used instead, e.g., $L^1$ st (lea absolute deviation), $L^P$ (the Pth power norm), as well as various specialized norms such as the Froebenius norm, the max norm, etc. Thus, for purposes of the instant disclosure, when it is said that an inversion is calculated, it should be understood and remembered that specific form that the inversion takes might be different depending on which norm is utilized.

Additionally, those of ordinary skill in the art will recognize that whenever quantities such as the shot location are said to be "known" there is always some amount of indeterminacy in even so-called known values. Thus, a given or "known" value should be understood to be approximate as to its precise location.

Further, although in the preferred arrangement each seismic trace will contain data representative of a single source activation, it is certainly possible that seismic energy from more than one source might be present in the trace (e.g., if a simultaneous source survey were to be conducted). Thus, when it is said herein that a trace contains signals from one seismic source, that language should not be construed to rule out the possibility that energy from other sources might be present on the trace. Instead, it should be that understood that there is at least one source activation of interest within the trace.

CONCLUSIONS

The instant disclosure has presented a method for determining both positioning and timing of OBSs from first breaks on the common receiver gathers. In the deep water synthetic example presented above the OBS positions were determined with an accuracy of 0.2, 0.2, and 1.3 meters for the x, y, and z coordinates respectively. The reference time estimation fell within 0.7 ms. Furthermore, the estimated drift slope was accurate to the order of $10^{-10}$, the same accuracy as a typical atomic clock. Based on the above, it is likely that a typical thermally insulated clock with accuracy on the order of $10^{-7}$ could be used with the method taught here to obtain time and positioning accuracy comparable to that which might be obtained using much more expensive (and power hungry) hardware. Although the error analysis was performed in the deepwater context, the aperture analysis indicated that similar order of accuracy should be expect for a wider range of water depths.

Note that, although the invention disclosed herein was largely discussed in terms of seismic traces from OBS systems, that was done for purposes of specificity only and not out of any intent to limit the instant invention to operation on only that sort of data. Within the text of this disclosure, the terms seismic trace and seismic gather are intended to be used in the broadest possible sense, and they are meant to apply to conventional 2D and 3D traces and CMP gathers, as well as to other sorts of gathers which might include, without limitation, CRP gathers, CCP gathers (i.e., "common conversion point" gathers), CACP ("common asymptotic conversion point") gathers, common offset gathers, common shot/receiver gathers, etc, the most important aspect of a "gather" being that it represents an a collection of unstacked seismic traces from either a 2D or 3D survey organized according to some field or other parameter.

Additionally it should be noted that in some preferred embodiments the velocity of the medium, v, might be left as a variable and an inversion as suggested above could be used to estimate that parameter as well. Although the speed of seismic signals in water is generally assumed to be a known/constant value, there are instance where it is different enough from the conventional value to merit separately estimating it as part of the instant method. Thus, it should be understood that when the instant method is referred to herein, the velocity of the medium (which will preferably be water or other near-constant velocity medium) might be estimated along with the receiver locations.

It should further be noted that, although in the preferred embodiment the instant method will be used to locate receivers, the same approach could (and has) been used to locate sources. In such an instance, a shot will be selected and each receiver that recorded that shot will be identified. Then, the algorithm described above will be repeated with the undetermined source location replacing the unknown receiver location and the known (or recently calculated) receiver locations recorded by that shot replacing the source activation locations in the equation. Thus, in the claims that follow it should be understood that in each instance where an OBS receiver is mentioned that could instead be a source activation.

Finally, in the previous discussion, the language has been expressed in terms of processing operations performed on conventional seismic data. But, it is understood by those skilled in the art that the invention herein described could be applied advantageously in other subject matter areas, and used to locate other subsurface minerals besides hydrocarbons. By way of example only, the same approach described herein could potentially be used to process and/or analyze multi-component seismic data, shear wave data, converted mode data, cross well survey data, full waveform sonic logs, ground penetrating radar, CSEM (controlled source electromagnetic data)/t-CSEM (transient controlled source electromagnetic data), any acquisition technique that records wave field data, or model-based digital simulations of any of the foregoing. Additionally, the methods claimed herein after can be applied to mathematically transformed versions of these same data traces including, for example: filtered data traces, migrated data traces, frequency domain Fourier transformed data traces; transformations by discrete orthonormal transforms; instantaneous phase data traces, instantaneous frequency data traces, quadrature traces, analytic traces; etc. In short, the process disclosed herein can potentially be applied to a wide variety of types of geophysical time series, but it is preferably applied to a collection of spatially related time series. Thus, when the term "seismic data" is used here, that term should be broadly construed to potentially include data collected from any of the foregoing sources and/or combinations of same.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of geophysical exploration within a predetermined volume of the earth containing subsurface structural and stratigraphic features conducive to the generation, migration, accumulation, or presence of hydrocarbons, wherein is provided an OBS seismic survey that was collected by recording seismic waves using a plurality of receivers that are situated within a body of water, each of said receivers being associated with a plurality of seismic traces in said OBS seismic survey, and each of said receivers having a clock associated therewith, comprising the steps of:
   a. selecting one of said plurality of receivers;
   b. selecting a plurality of seismic traces associated with said selected receiver;
   c. determining a direct arrival first break time through the water for each of said selected plurality of seismic traces associated with said selected receiver, thereby obtaining a corresponding plurality of first break times;
   d. determining a location of a seismic source associated with each of said plurality of seismic traces associated with said selected receiver;
   e. determining a length of time since a clock associated with said selected receiver was last synchronized;
   f. using any of said determined first break times, said determined length of time since said clock associated with said selected receiver was last synchronized, and any of said determined locations of said seismic sources to simultaneously determine a location in three dimensions of said selected receiver and a drift correction associated with said selected receiver;
   g. associating said determined location of said selected receiver and said determined drift correction associated with said selected receiver with each of said selected plurality of seismic traces;
   h. imaging at least a portion of said predetermined volume of the earth using said selected plurality of seismic traces, said determined location of said selected receiver, and said determined drift correction associated with said selected receiver; and,
   i. using at least said imaged portion of said predetermined volume of the earth to explore for hydrocarbons therein.

2. The method according to claim 1, wherein step (f) comprises the step of: using any of said determined first break times, said determined length of time since said clock associated with said selected receiver was last synchronized, and any of said determined locations of said seismic sources to simultaneously determine said location in three dimensions of said selected receiver and said drift correction associated with said selected receiver by solving an over determined system of equations.

3. The method according to claim 2, wherein said over determined system of equations is solved via a linearized iterative inversion of said any of said determined first break times and said any of said determined locations of said seismic sources.

4. The method according to claim 3, wherein is provided an initial estimate of said location of said selected receiver and an initial estimate of said drift correction, and wherein said linearized iterative inversion of step (e) comprises the step of:
using any of said determined first break times and any of said determined locations of said seismic sources to iteratively determine an estimate of a location of said selected receiver and an estimate of a drift correction using the equation $$m = \lfloor (G^T G)^{-1} + \epsilon I \rfloor G^T d,$$

where, $$m = [\Delta x_r, \Delta y_r, \Delta z_r, t_0, a]^T,$$

$\Delta x_r$ is an x coordinate deviation from said initial location estimate,
$\Delta y_r$ is a y coordinate deviation from said initial location estimate,
$\Delta z_r$ is a z coordinate deviation from said initial location estimate,
$t_0$ is an intercept component of said time drift estimate,
a is a slope component of said time drift estimate,
I is an identity matrix,
$\epsilon$ is a whitening factor, $$G = \left[ \frac{x_r - x_s}{vR} \quad \frac{y_r - y_s}{vR} \quad \frac{z_r - z_s}{vR} \quad 1 \quad t \right],$$

$(x_r, y_r, z_r)$ is a current estimate of said selected receiver location in three dimensions,
$(x_s, y_s, z_s)$ is a location of seismic source recorded by said selected receiver,
t is said determined length of time since said clock associated with said selected receiver was last synchronized,
v is a velocity of water, and, $$R = \sqrt{(x_s - x_r)^2 + (y_s - y_r)^2 + (z_s - z_r)^2}.$$

5. The method according to claim 4 wherein $(x_r, y_r, z_r)$ is chosen to be $(x_0, y_0, z_0)$ during a first iteration of said linearized iterative inversion, where $(x_0, y_0, z_0)$ is an approximate location in three dimensions of said selected receiver.

6. A method of geophysical exploration within a predetermined volume of the earth containing subsurface structural and stratigraphic features conducive to the generation, migration, accumulation, or presence of hydrocarbons, wherein is provided an OBS seismic survey comprised of a plurality of seismic traces, each of said plurality of seismic traces being associated with a receiver situated within a body of water, and each of said receivers having an internal clock associated therewith comprising the steps of:

a. selecting one of said plurality of receivers;
b. selecting a plurality of seismic traces from said seismic survey that were recorded by said selected receiver, each of said seismic traces corresponding to one of one or more source activations;
c. determining a direct arrival first break time through the water for each of said selected plurality of seismic traces, thereby obtaining a corresponding plurality of first break times;
d. determining a location of each of said one or more seismic source activations;
e. determining a length of time since a clock associated with said selected receiver was last synchronized;
f. using said first break time for each of said selected plurality of seismic traces, said determined length of time since said clock associated with said selected receiver was last synchronized, and said determined location of said each of said one or more seismic source activations to simultaneously determine a location in three dimensions of said selected receiver and a drift correction for said selected receiver;
g. using at least said location of said selected receiver and said determined drift correction to determine a time correction for each of said selected plurality of seismic traces;
h. using said determined time corrections and said selected plurality of seismic traces to image at least a portion of said predetermined volume of the earth using said selected plurality of seismic traces and said determined location of said selected receiver; and,
i. using at least said imaged portion of said predetermined volume of the earth to explore for hydrocarbons therein.

7. The method according to claim 6, wherein step (f) comprises the step of using said first break time for each of said selected plurality of seismic traces, said determined length of time since said clock associated with said selected receiver was last synchronized, and said determined location of said each of said one or more seismic source activations to simultaneously determine a location in three dimensions of said selected receiver and a drift correction for said selected receiver by solving an over determined system of equations.

8. The method according to claim 7, wherein said over determined system of equations is solved via a linearized iterative inversion of said any of said determined first break times and said any of said determined locations of said seismic sources.

9. The method according to claim 8, wherein is provided an initial estimate of said location of said selected receiver and an initial estimate of said drift correction, and wherein said linearized iterative inversion of step (e) comprises the step of:
using any of said determined first break times and any of said determined locations of said seismic sources to iteratively determine an estimate of a location of said selected receiver and an estimate of a drift correction using the equation $$m = \lfloor (G^T G)^{-1} + \epsilon I \rfloor G^T d,$$

where, $$m = [\Delta x_r, \Delta y_r, \Delta z_r, t_0, a]^T,$$

$\Delta x_r$ is an x coordinate deviation from said initial location estimate,
$\Delta y_r$ is a y coordinate deviation from said initial location estimate,
$\Delta z_r$ is a z coordinate deviation from said initial location estimate,
$t_0$ is an intercept component of said time drift estimate,
a is a slope component of said time drift estimate, I is an identity matrix,
ε is a whitening factor, $$G = \left[\frac{x_r - x_s}{vR} \frac{y_r - y_s}{vR} \frac{z_r - z_s}{vR} 1t\right],$$

$(x_r, y_r, z_r)$ is a current estimate of said selected receiver location in three dimensions,
$(x_s, y_s, z_s)$ is a location of seismic source recorded by said selected receiver,
t is said determined length of time since said clock associated with said selected receiver was last synchronized,
v is a velocity of water, and, $$R = \sqrt{(x_s - x_r)^2 + (y_s - y_r)^2 + (z_s - z_r)^2}.$$

10. The method according to claim 9, wherein $(x_r, y_r, z_r)$ is chosen to be $(x_0, y_0, z_0)$ during a first iteration of said linearized iterative inversion, where $(x_0, y_0, z_0)$ is an approximate location in three dimensions of said selected receiver.

\* \* \* \* \*